(12) United States Patent
Tamborini et al.

(10) Patent No.: US 8,047,160 B2
(45) Date of Patent: Nov. 1, 2011

(54) KEEPING CAGE FOR LABORATORY ANIMALS

(75) Inventors: Paolo Tamborini, Cardano Al Campo (IT); Giovanni Malnati, Malnate (IT)

(73) Assignee: Tecniplast S.p.A., Buguggiate (IT)

( * ) Notice: Subject to any disclaimer, the term of this patent is extended or adjusted under 35 U.S.C. 154(b) by 130 days.

(21) Appl. No.: 12/265,747

(22) Filed: Nov. 6, 2008

(65) Prior Publication Data

US 2009/0165729 A1 Jul. 2, 2009

(30) Foreign Application Priority Data

Dec. 27, 2007 (IT) .............................. MI2007A2439

(51) Int. Cl.
*A01K 1/03* (2006.01)
*A01K 5/00* (2006.01)
(52) U.S. Cl. ......................... 119/417; 119/472; 119/456
(58) Field of Classification Search .................. 119/456, 119/454, 420, 418, 417, 419, 455, 457
See application file for complete search history.

(56) References Cited

U.S. PATENT DOCUMENTS

| | | | |
|---|---|---|---|
| 3,731,657 A | | 5/1973 | Alessio |
| 3,865,082 A | * | 2/1975 | Lovitz et al. .................. 119/452 |
| 3,888,211 A | * | 6/1975 | Allen ............................ 119/457 |
| 4,201,153 A | * | 5/1980 | Nace ............................. 119/224 |
| 4,215,650 A | * | 8/1980 | Campbell ..................... 119/417 |
| 5,996,535 A | | 12/1999 | Semenuk et al. |
| 6,227,146 B1 | * | 5/2001 | Gabriel et al. ................. 119/419 |
| 6,308,660 B1 | | 10/2001 | Coiro, Sr. et al. |
| 6,553,939 B1 | | 4/2003 | Austin et al. |
| 7,320,294 B2 | * | 1/2008 | Irwin et al. ..................... 119/455 |
| 7,578,263 B2 | * | 8/2009 | Donohoe ....................... 119/472 |
| 2003/0051676 A1 | * | 3/2003 | Rivard .......................... 119/419 |
| 2006/0254528 A1 | * | 11/2006 | Malnati et al. ................ 119/419 |

FOREIGN PATENT DOCUMENTS

| | | |
|---|---|---|
| EP | 1616482 A2 | 1/2006 |
| EP | 1616482 A3 | 5/2006 |
| EP | 1719406 | 11/2006 |
| EP | 1719406 A1 | 11/2006 |
| EP | 1719406 B1 | 1/2008 |

(Continued)

OTHER PUBLICATIONS

An unofficial extended European Search Report for European patent application EP 0816483.9 corresponding to U.S. Appl. No. 12/265,747.

(Continued)

*Primary Examiner* — Rob Swiatek
*Assistant Examiner* — Joshua Huson
(74) *Attorney, Agent, or Firm* — LeClairRyan, a Professional Corporation (57) ABSTRACT

A keeping cage for laboratory animals, specifically rodents, is characterized in that it provides for a large floor surface on several levels, the transit of animals from one level to the higher or lower level being ensured by the presence of appropriate openings in the partitioning floors. The keeping cage allows for the provision of a space available to animals, which is sufficiently large in terms of floor surface and in terms of height between the floors to ensure a good level of wellbeing for the animals, which do not therefore suffer from behavioral disturbances. Cage for keeping laboratory animals, specifically adapted to keep laboratory animals, particularly rodents, including a base body to which an openable lid is connected, characterized in that the lid features a port for accessing the inside without removing the lid.

21 Claims, 8 Drawing Sheets

FOREIGN PATENT DOCUMENTS

| | | |
|---|---|---|
| EP | 2087787 A2 | 8/2009 |
| EP | 2087787 A3 | 11/2009 |
| WO | WO0124618 | 4/2001 |
| WO | WO03096801 A1 | 11/2003 |

OTHER PUBLICATIONS

Unofficial European search report for European application 08425558.7.

* cited by examiner

KEEPING CAGE FOR LABORATORY ANIMALS

BACKGROUND

The present invention relates to a ventilated cage for keeping laboratory animals, typically rodents.

It is known that keeping animals, in this case, specifically rodents, in laboratories, is governed by standards which impose certain dimensional parameters of the keeping cages according to the animal's size, or rather to its body weight.

More in detail, the standards currently in force require that, for rats having a body weight higher than 600 grams, the keeping cages must include a surface of at least 600 cm$^2$ for each animal.

Since two or more animals are normally located in each keeping cage, the floor surface which must be available to each rat according to the standards makes the cages quite cumbersome.

As known, the cages are arranged side-by-side in laboratories on appropriate shelves, and it is therefore intuitive that the volume of the cages is a main parameter which affects the number of cages, and thus of animals, which may be kept in a laboratory.

Therefore, keeping cages which meet the standards with regards to space available to animals are known, which however have the drawback of not rationalizing such a space, resulting in an excessive total volume of the cage.

It has further been noted that although standards impose a minimum number of square centimeters of floor surface available to each animal, even the height space available to the animal considerably affects its behaviour. The restrictive effect that a cage of unsuitable height exerts on the behavioral aspects of the animal, specifically of the rat, is indeed apparent, with regards to activities such as play, competition and exploration, which normally need the standing posture which is a negative effect which may even considerably alter the animal's natural behavior.

Furthermore, the cages must meet ergonomic and intervention ease parameters for the correct operating by experimenters.

A further problem connected with cages such as the above is that it is impossible to access their inside in order to carry out operations such as introducing food or substituting empty mangers or dirty components, without removing the lid, which may be complicated or even impossible, when the cage is placed on a shelf.

It is thus the main task of the present invention to provide a keeping cage for laboratory rodents which allows to adequately meet the requirements set forth above, thus eliminating the drawbacks left unsolved by the cages of known type.

In the scope of this task, it is the object of the present invention to provide a keeping cage which respects the standards imposed with regards to the minimum surface available to each animal.

It is a further aspect of the present invention to provide a keeping cage which is compact, light and appropriately ventilated so as to ensure micro-environmental and external element barrier parameters.

This task, and these and other objects which will be explained in greater detail below are reached by a keeping cage for laboratory animals, specifically for laboratory rats, including a basic body of the cage to which an openable lid is connected, which is characterized in that it includes inside one or more essentially horizontal partitioning floors arranged at different heights so as to create several floor surfaces for the animals.

According to a second embodiment, the invention relates to a cage for keeping laboratory animals, specifically adapted to keep laboratory animals, particularly rodents, including a base body to which an openable lid is connected, characterized in that the lid features a port for accessing the inside without removing the lid.

BRIEF DESCRIPTION OF THE DRAWINGS

Further features and advantages of the present invention will be more apparent from the following detailed description by way of non-limitative example and shown in the accompanying drawings, in which.

DETAILED DESCRIPTION

According to a preferred embodiment of the present invention shown by way of non-limitative example in the mentioned Figures, the keeping cage 1 according to the present invention includes a base body 2 of the cage, preferably made of transparent, washable and autoclavable plastic material. The base body 2 of the cage, closed by lid 3, is provided with an appropriate closing element 3a, which firmly closes the lid 3 against the base body 2 of the cage.

Figure 3:
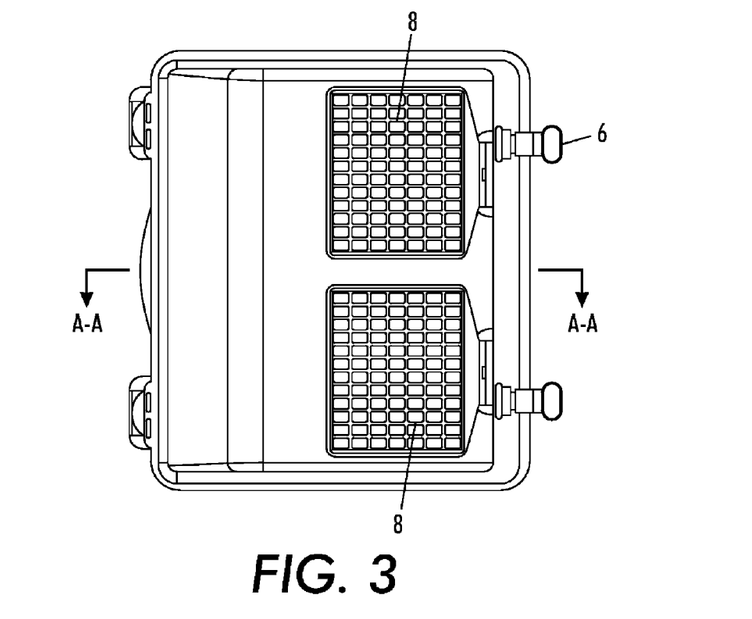
FIG. 3 shows a top view of the cage according to the present invention.
Figure 4:
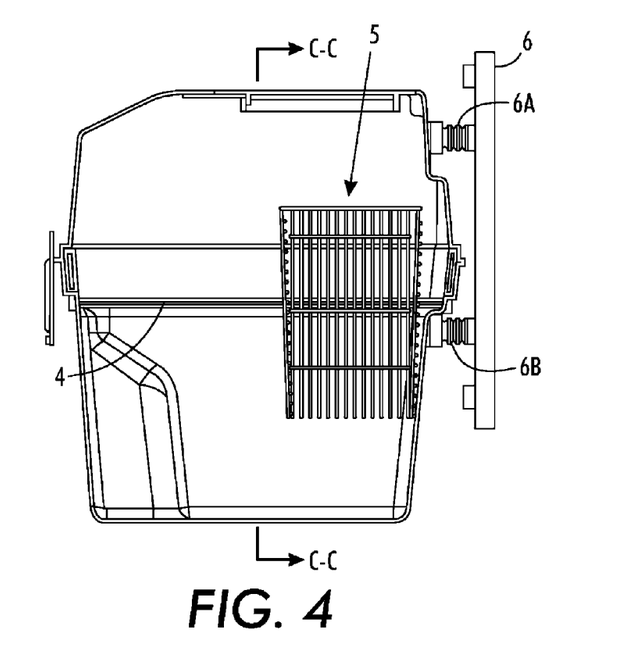
FIG. 4 shows the section taken along the plane A-A shown in FIG. 3 of the cage according to the present invention.

For example, FIG. 4 shows a partitioning floor 4 which divides the cage 1 into two levels according to section A-A taken along the vertical transversal plane shown in FIG. 3.

Obviously, there may be any number of partitioning floors as desired, thus increasing the number of levels of the cage. In the example shown here, there is only one partitioning floor and thus a lower level and a higher level inside the cage.

More in detail, as the base body 2 of the cage and as the lid 3, the partitioning floor 4 will also be appropriately made of washable, autoclavable plastic material, and appropriately dimensioned so as to safely support the weight of one or more animals which may obviously climb onto it at the same time.

Furthermore, the partitioning floor 4 will be appropriately positioned at an appropriate supporting element, not shown in the Figures, which might be formed, for example, by a groove or by an appropriate shaping in an internal peripheral area inside the body. The partitioning floor 4 may be removable. In this manner, the interventions on the animals by the researcher are facilitated because the user may remove the partitioning floor 4 to access the lower level of the cage.

Figure 5:
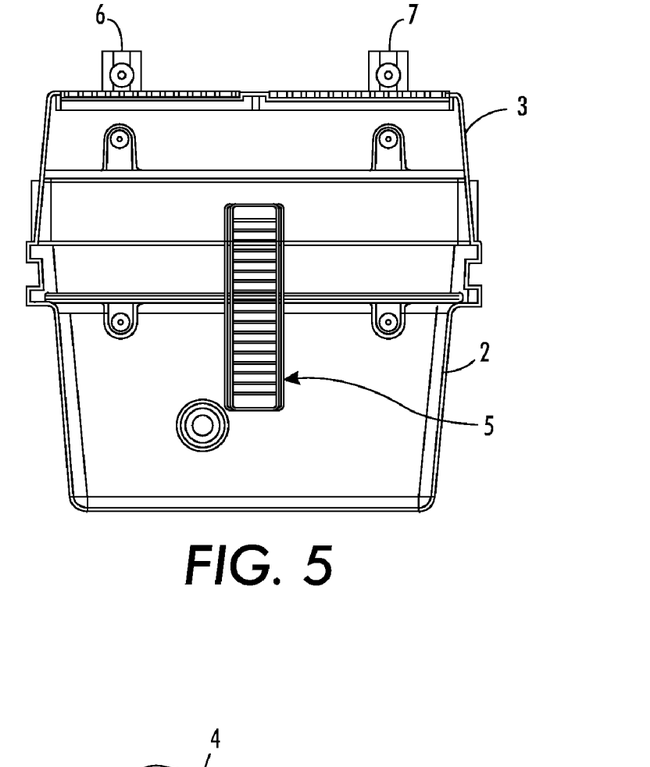
FIG. 5 shows the section taken along the plane C-C shown in FIG. 4 of the cage according to the present invention.

As shown for example in FIG. 5, which shows the section of the cage 1 taken along plane C-C shown in FIG. 4, the cage according to the present invention is appropriately provided with a manger 5 arranged at a first opening 11, appropriately provided in the partitioning floor 4, as better explained below.

Figure 6:
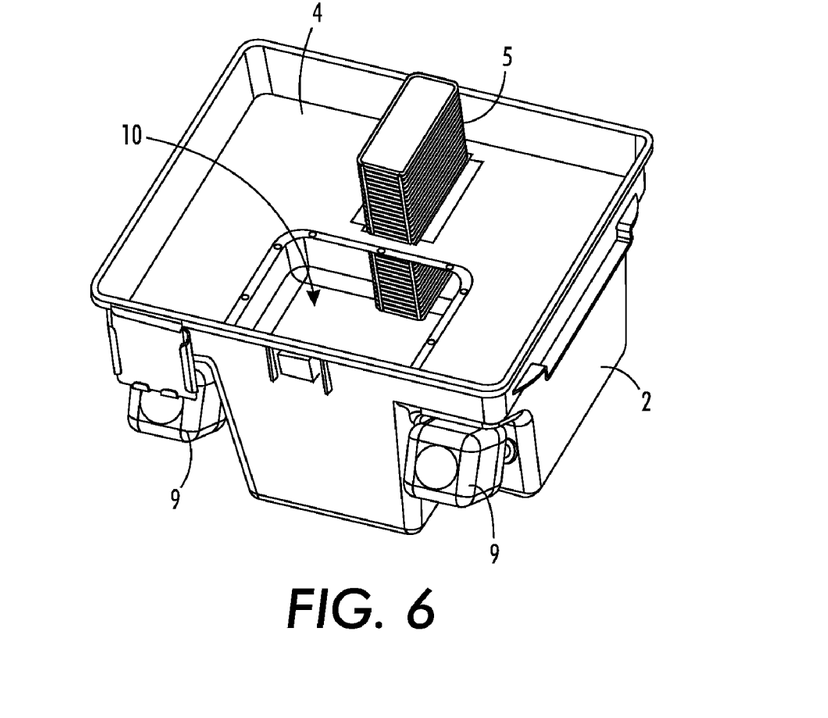
FIG. 6 shows a perspective view of the cage according to the present invention without lid.
Figure 7:
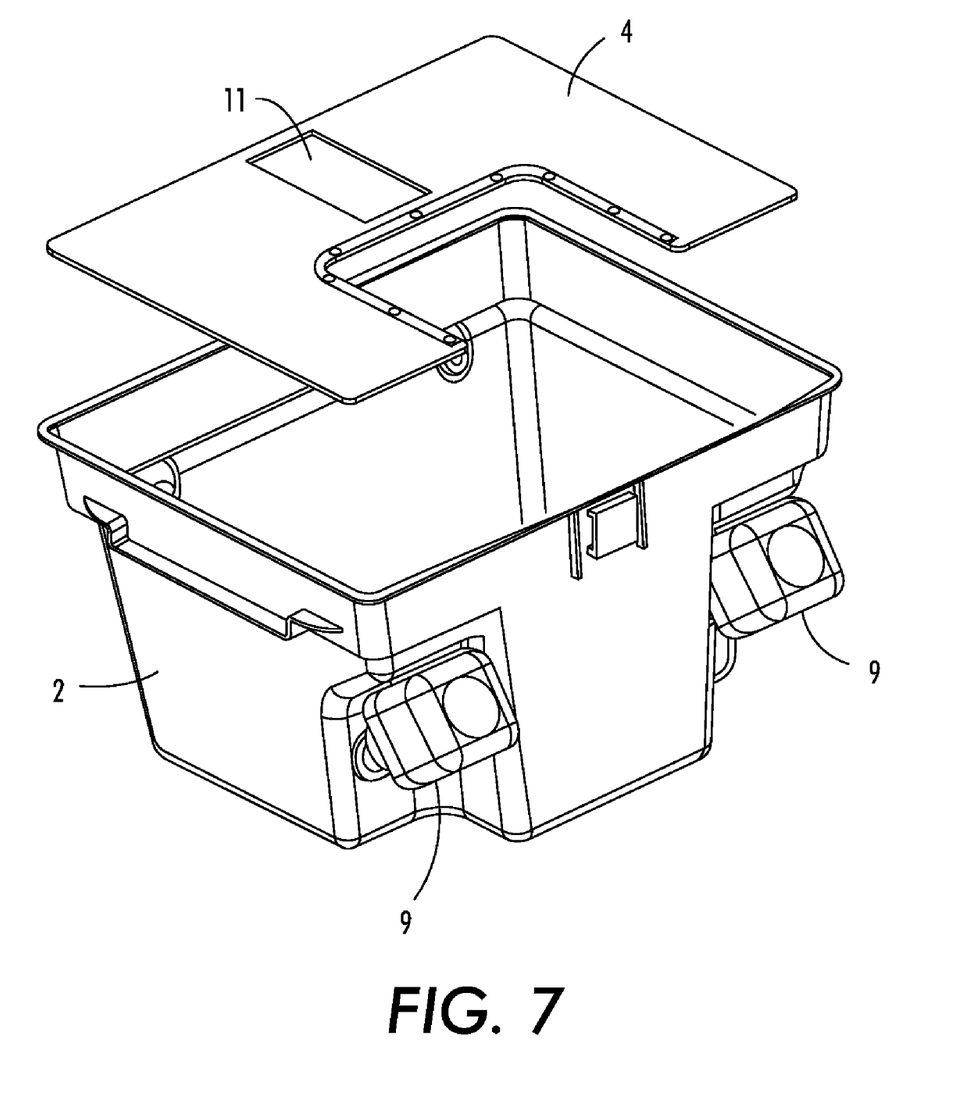
FIG. 7 shows a perspective view of the cage according to the present invention without lid and partially exploded.

Specifically referring to FIGS. 6 and 7, a preferred embodiment of the partitioning floor 4 is shown.

Specifically, a second further opening 10 is provided on the partitioning floor 4. Such a second opening 10 puts the two levels of the cage into communication, so that the operator may access the animals either on the upper level or on the lower level of the cage, once the lid 3 has been opened. Furthermore, the opening 10 is used by the animals to transit from one level to the other.

The manger 5 is developed in height concerning several levels. Such a manger is inserted into the first opening 11 obtained in the partitioning floor 4 and is firmly secured thereto, in a removable manner, by means of appropriate joints. In this manner, the manger 5 has the two-fold function of feeding the animals, regardless of whether they are on the first or second level, and acting as a ladder for the transit of animals from one level to the other.

As shown in FIG. 3, which depicts a top view of the cage according to the present invention, openings 8 provided with appropriate filters of known type which are useful for ventilating the cage when this is removed from the shelf where it is normally positioned, are appropriately provided on the lid 3.

When the cage 1 is placed on a specific laboratory shelf, the cage is ventilated by means of a known, forced ventilation system. Valves 6a, 6b, 7a, 7b from the cage are indeed provided on the rear external face of the base body 2 and on the lid 3 for letting the ventilation air in and out the cage. Specifically, the air is provided for circulating between the two pipe segments indicated in the Figures by reference numerals 6 and 7, when the cage is inserted in the shelving, and the air is pushed by an external forced air circulation system to which the pipe segments 6 and 7 are connected.

Such pipes 6 and 7 communicate with the internal environment of the cage through one-way valves. Specifically, assuming for example that fresh air circulates in the pipe 6, the valves 6a and 6b take fresh air into the cage, to the upper level and to the lower level of the cage, respectively.

Similarly, if the pipe 7 is adapted to aspirate the air from inside the cage, the valves 7a and 7b allow aspiration of the air from the cage.

The system thus allows an effective forced circulation on each level. With the configuration shown herein, when increasing the number of levels of the cage, it is sufficient to equip each level with a suction valve and an air introduction valve to obtain an effective forced circulation on each level.

The cage 1 shown herein has, according to a preferred embodiment of the present invention, a total surface in accordance with the standards which is developed on several levels, as mentioned, each level having a height compliant to the standards so as to ensure that the animals may assume the standing posture on the hind paws.

According to other embodiments, the cage according to the present invention will be able to have two or more levels and will be able to accommodate three or more animals.

A silicone seal is provided between the body 2 and the lid 3 and further closing buttons of known type may be further provided.

The supporting guides of the cage act as a handle for the operator when the cage is off the shelf.

Figure 1:
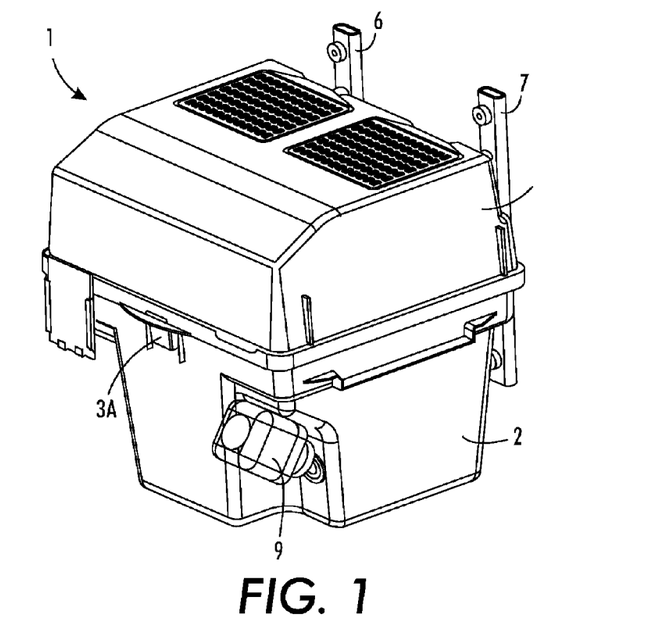
FIG. 1 shows a perspective view of the keeping cage according to the present invention.
Figure 2:
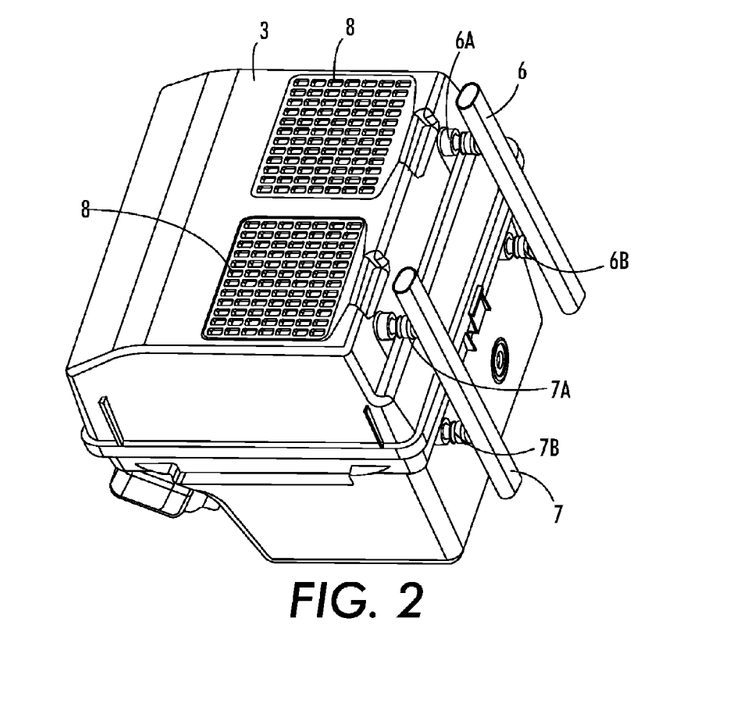
FIG. 2 again shows a perspective view of the cage according to the present invention seen from another angle.

Again, the cage according to the present invention will be appropriately provided with a drinking system by means of one or more bottles of the type indicated by reference number 9 in FIG. 1. However, the drinking system may be of different type and positioned in a different point of the cage.

Figure 8:
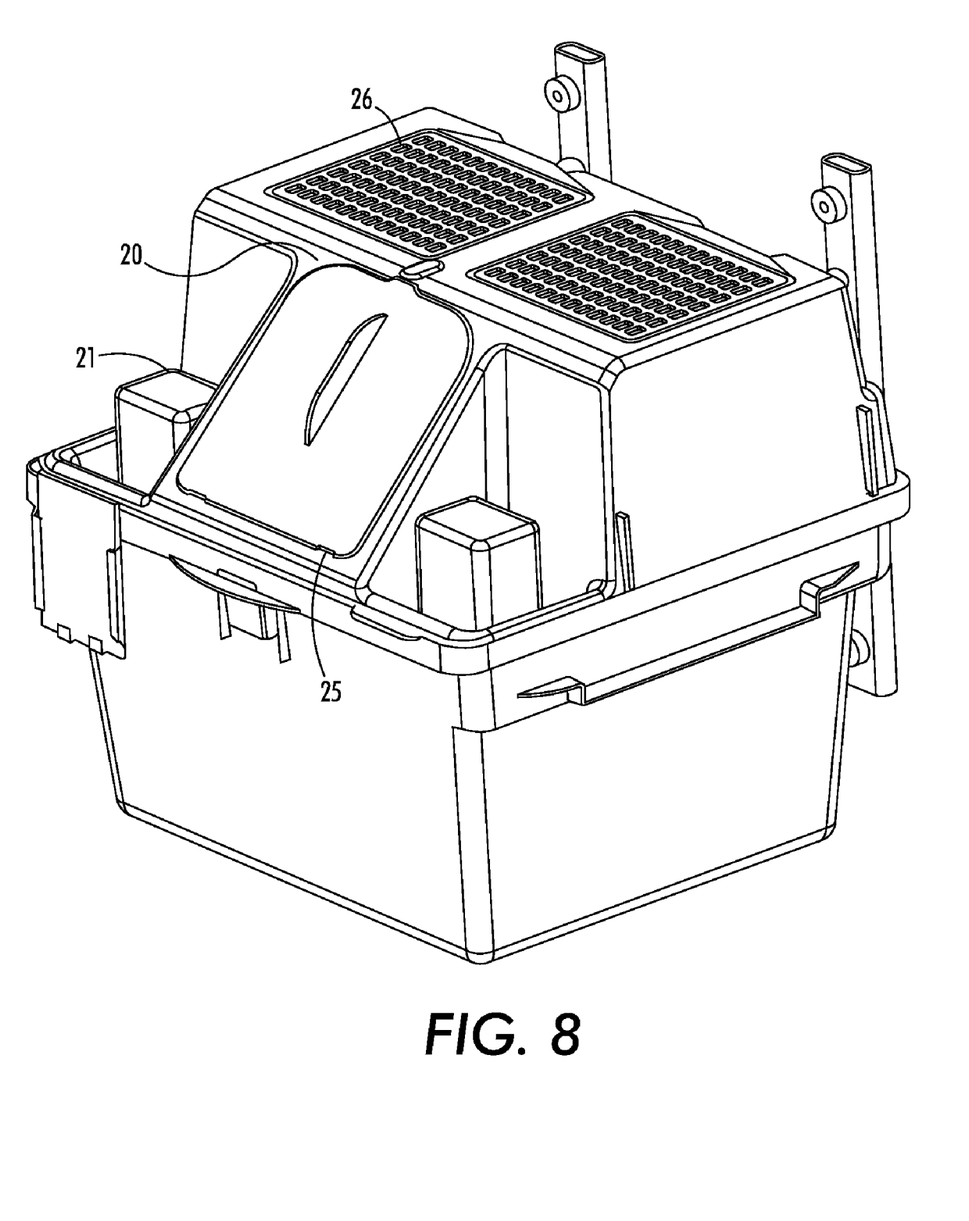
FIG. 8 shows a perspective view of the keeping cage according another embodiment of the present invention.
Figure 9:
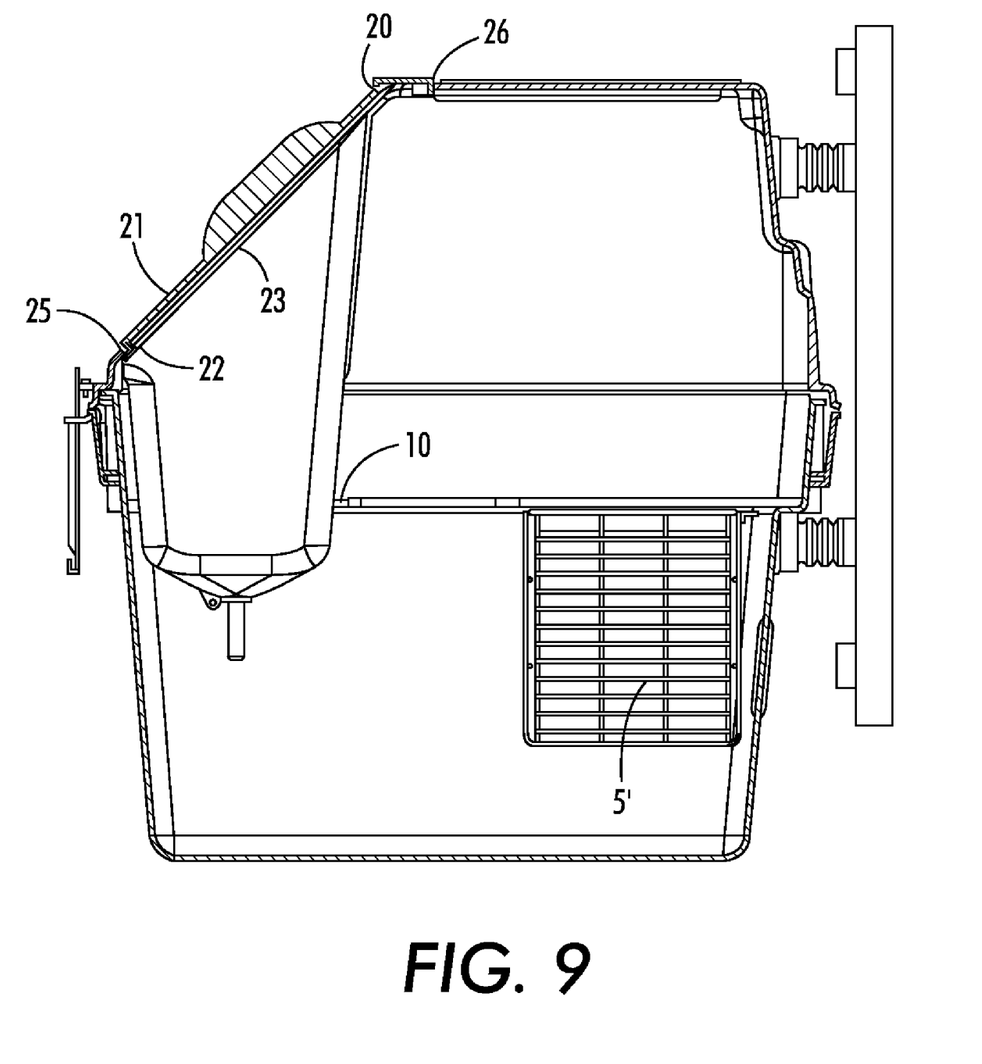
FIG. 9 shows a sectional view of the keeping cage according to the embodiment of FIG. 8.
Figure 10:
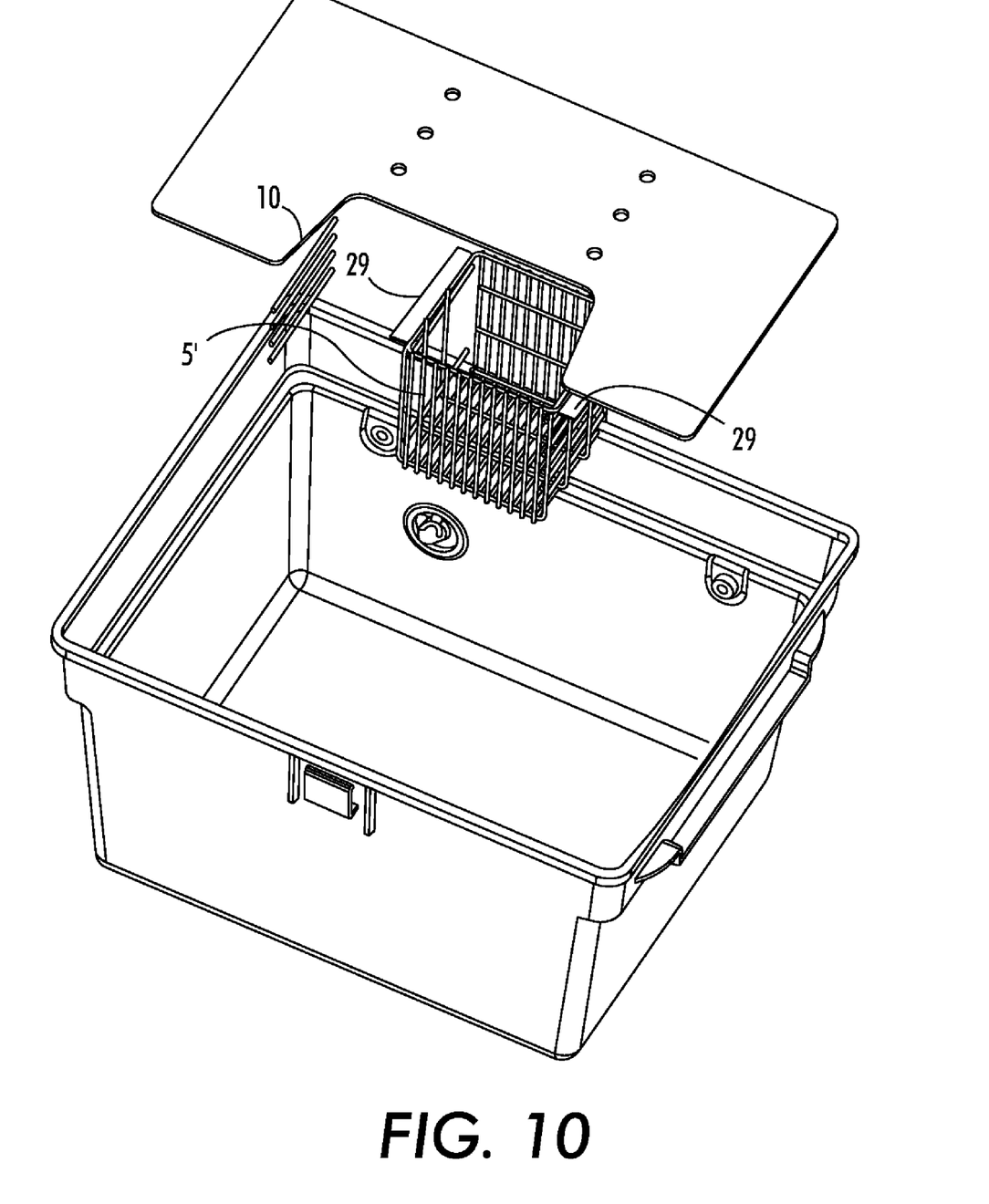
FIG. 10 shows an exploded view of the keeping cage according to the to the embodiment of FIG. 8 without the lid.

According to a second embodiment, the invention relates to a cage for keeping laboratory animals, specifically adapted to keep laboratory animals, particularly rodents, including a base body to which an openable lid is connected, characterized in that the lid features a port for accessing the inside without removing the lid. The port preferably comprises a closure, adapted to close the port and openable in order to allow the access to the inside of the cage. The embodiment is shown in FIGS. 8 to 10.

The cage may be similar to the cage described above, except for the presence of port 20, closed by the removable cover 21. The port is provided in the lid and the cover can be opened or even removed without opening the lid thus making the inside of the cage accessible for operations such as changing the manger, as can be better derived from FIG. 9, may have, on its inner surface 23 a perimetral relief 22 capable to mate precisely with the edge of the port, to improve the closing and to keep the cover in its right position. It may also feature means for retaining the cover such as teeth 25, projecting to the external border of the cover in order to clasp to the edge of the port. The lid may feature a pivotable element capable of retaining the cover, in cooperation with elements 25, other means for retaining the closure can be developed by the skilled in the art. If requested a gasket or any other sealing means can be provided to allow air or fluid tightness between port and closure.

The cage comprising a port in the lid as above described in any case improves maintenance of the cage and its content, even without the need to remove the cage from the shelf. The port is thus preferably placed on the front of the cage, anyway in position easily accessible, in particular easily accessible when the cage is on the shelf.

Figure 11:
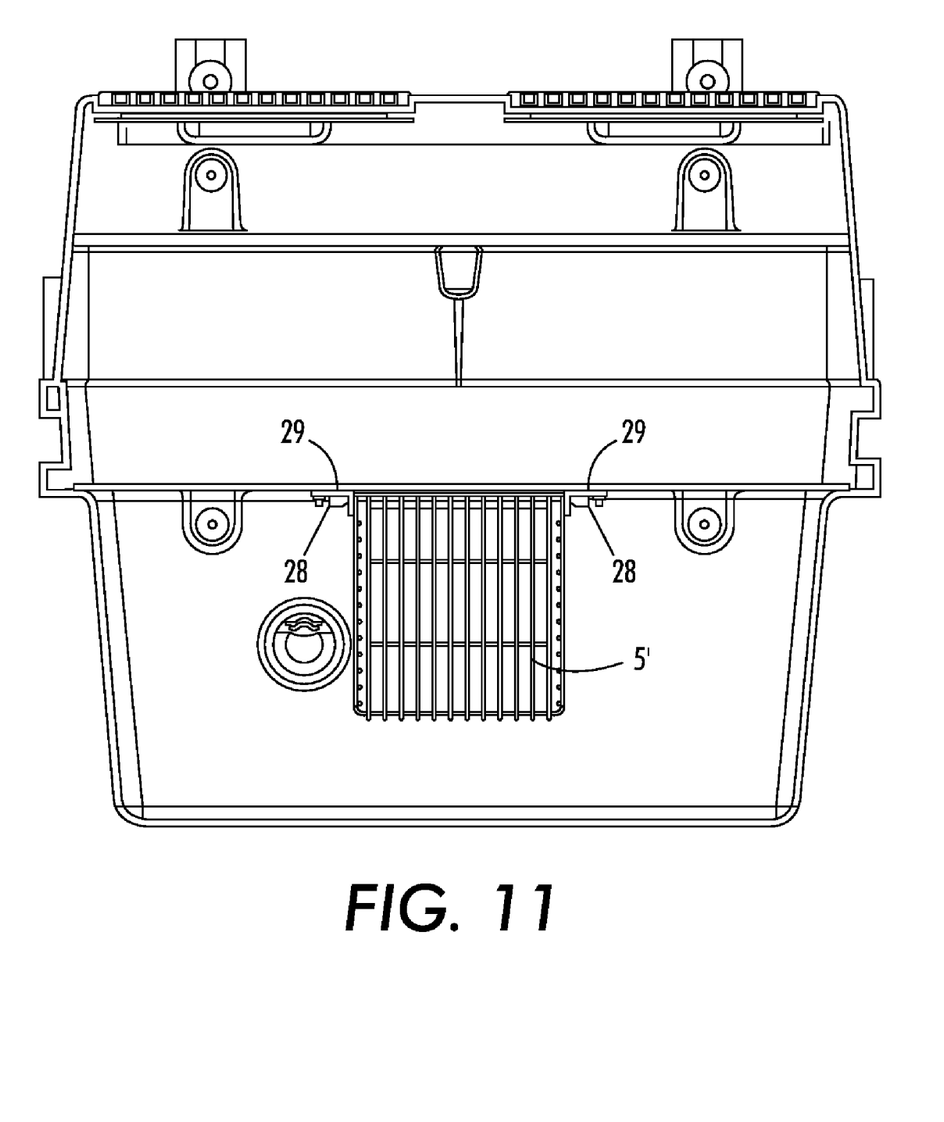
FIG. 11 shows another sectional view of the keeping cage according to the embodiment of FIG. 8.

This embodiment is anyway particularly advantageous when the cage has partitioning floors as above described. In this case, it is preferred that the port is placed substantially in correspondence of the second opening 10, e.g. above it, as exemplified in FIGS. 9 and 10, anyway preferably where the opening can be easily reached from the port, for example in order to access the manger 5' According to a further embodiment, the manger 5' can be removed without the need to remove the lid 3, but simply from the port for example the first opening may be not separated from the second, thus the manger can be shifted from the first opening for removal. According to a further embodiment there is no first opening and the manger is placed only on one of the levels into which the cage is divided by the partitioning floors. For example, in FIGS. 8 to 10, the manger is placed in the lower level, and preferably is attached under the partitioning floor, for example by means of guides 28 (see FIG. 11), fixed on the lower side of the floor, into which parallel wings 29 of the manger can slide. Thus the manger can be accessed from the port, through the second opening and slidingly inserted into or removed from the guides.

It has thus been shown that the keeping cage for laboratory rodents according to the present invention reaches the suggested object and objectives.

Specifically, it has been shown that the multilevel cage according to the present invention allows the provision for a large floor surface available to the animals by arranging such a surface on several levels, so as to limit the volume of the cage in width and depth.

Furthermore, the multilevel keeping cage according to the present invention ensures that the laboratory rodents have a large available space, so as to avoid all restrictive effects on the animals' behavior.

Not last object achieved by the present invention is that of being manageable, ergonomic and compact, so as to facilitate the possible handling of the cage itself by the operator and so as to allow the accommodation of a high number of cages on an appropriately arranged shelf.

A yet further object achieved by the multilevel cage according to the present invention is that of obtaining an optimal forced air circulation on each level.

Not last object achieved by the cage according to the present invention is that of allowing the animals contained therein to maintain a natural physiology, transiting from one level to the other by climbing up a ladder, thus being spurred to move, explore, and play.

Many changes may be made by a person skilled in the art without departing from the scope of protection of the present invention.

The scope of protection of the claims, therefore, must not be limited to the disclosures or to the preferred embodiments described by way of example, but rather the claims must include all the features of patentable novelty inferable from the present invention, including all the features which would be treated as equivalent by a person skilled in the art.

The invention claimed is:

1. A cage for keeping laboratory animals, specifically adapted to keep laboratory one or more animals, particularly rodents, comprising:
   a base body to which an openable lid is connected;
   said base body including inside one or more partitioning floors, which are essentially horizontal and arranged at heights so as to create several floor surfaces for the animals wherein each of said one or more partitioning floors is provided with a first opening receiving an element acting as a ladder which extends above and below said one or more partitioning floors, said element acting as the ladder comprising at least one sidewall having a plurality of openings, said element acting as the ladder also acts as a manger, including several levels for said manger, each of said one or more partitioning floors being further provided with a second opening adapted to allow the animals to transit from one level to the other and to allow the operator to access the animals.

2. The keeping cage for animals according to claim 1, wherein said one or more partitioning floors are associated to said cage.

3. The keeping cage for animals according to claim 1, wherein said one or more partitioning floors are removably associated to said cage.

4. The keeping cage for animals according to claim 1, wherein said one or more partitioning floors are associated to said base body of said cage.

5. The keeping cage for animals according to claim 1, wherein said manger is developed in height crossing said opening obtained in the partitioning floor being thus reachable by the animals regardless of the level on which the animals are.

6. The keeping cage according to claim 1, further comprising:
   a forced air circulation system.

7. The keeping cage according to claim 6, wherein said forced air circulation system includes at least one inlet for introducing clean air into the cage and at least an outlet for releasing dirty air from the cage.

8. The keeping cage according to claim 7, wherein at least one of said air inlets and at least one of said air outlets are provided on each level.

9. The keeping cage according to claim 7, wherein said clean air inlets are put into communication with a pipe adapted to connect to an air circulation system outside the cage.

10. The keeping cage according to claim 7, wherein said dirty air outlets of the cage are put into communication with a pipe adapted to connect to an air circulation system outside the cage.

11. The keeping cage according to claim 7, wherein each of said air inlets of the cage and each of said air outlets of the cage is provided with self-closing means adapted to automatically close when the cage is removed from the shelf on which it is normally placed so as to isolate the inside of the cage from the external environment.

12. The keeping cage according to claim 11, wherein said self- closing means consist of valves.

13. The keeping cage according to claim 6, wherein said forced air circulation system concerns each floor.

14. The keeping cage according to claim 1, wherein it has a total floor surface compliant with dimensional standards, wherein the standards comprises minimum and maximum parameters of the keeping cages arranged on several levels.

15. The keeping cage according to claim 1, wherein each of said levels has a height compliant to height standards, wherein the height standards comprises minimum and maximum parameters of the keeping cages.

16. The keeping cage according to claim 1, wherein it is made of washable, autoclavable material.

17. The keeping cage according to claim 16, wherein the material is transparent.

18. The cage according to claim 1, wherein said lid includes a port for accessing the inside without removing said lid.

19. The keeping cage according to claim 18, wherein said first opening is accessible from said port.

20. The keeping cage according to claim 18, wherein said second opening is accessible from said port.

21. The keeping cage according to claim 18, comprising:
   a manger comprising at least one sidewall having a plurality of openings, wherein said manger is removably attached to the lower side of a partitioning floor, and is accessible from said port through said opening.

* * * * *